(12) United States Patent
Nam (10) Patent No.: US 11,093,418 B2
(45) Date of Patent: Aug. 17, 2021

(54) MEMORY DEVICE, PROCESSING SYSTEM, AND METHOD OF CONTROLLING THE SAME

(71) Applicant: SK hynix Inc., Icheon (KR)

(72) Inventor: Ji Hoon Nam, Icheon (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 16/508,580

(22) Filed: Jul. 11, 2019

(65) Prior Publication Data

US 2020/0034318 A1 Jan. 30, 2020

(30) Foreign Application Priority Data

Jul. 25, 2018 (KR) ........................ 10-2018-0086544

(51) Int. Cl.
*G06F 13/16* (2006.01)
*G06F 12/0862* (2016.01)
*G06F 3/06* (2006.01)

(52) U.S. Cl.
CPC ...... *G06F 13/1678* (2013.01); *G06F 12/0862* (2013.01); *G06F 13/1684* (2013.01)

(58) Field of Classification Search
CPC ...... G06F 12/08; G06F 11/10; G06F 12/0862; G06F 3/0613
See application file for complete search history.

(56) References Cited

U.S. PATENT DOCUMENTS

| 8,456,880 | B2 | 6/2013 | Norman | |
|---|---|---|---|---|
| 2003/0165076 | A1* | 9/2003 | Gorobets | G06F 3/0688 365/200 |
| 2012/0166891 | A1* | 6/2012 | Dahlen | G06F 12/0638 714/54 |
| 2014/0222610 | A1* | 8/2014 | Mikurak | G06Q 30/0633 705/26.5 |
| 2015/0363106 | A1* | 12/2015 | Lim | G06F 13/1694 711/167 |
| 2016/0026583 | A1* | 1/2016 | Shaeffer | G06F 12/1458 711/163 |
| 2016/0062896 | A1* | 3/2016 | Eguchi | G11C 29/52 714/764 |
| 2016/0170872 | A1* | 6/2016 | Kang | G06F 12/0246 711/103 |
| 2016/0196180 | A1* | 7/2016 | Kim | G06F 3/064 714/764 |
| 2017/0060749 | A1* | 3/2017 | Segev | G06F 13/10 |
| 2019/0146712 | A1* | 5/2019 | Lee | G06F 3/0659 711/103 |

FOREIGN PATENT DOCUMENTS

| KR | 20140065678 A | 5/2014 |
|---|---|---|
| KR | 20180011991 A | 2/2018 |

* cited by examiner

*Primary Examiner* — Getente A Yimer (57) ABSTRACT

A device includes a first memory including a plurality of memory dice that are arranged vertically to each other, a second memory of a second type, and a controller die that transfers first data between the first memory and a first internal memory of a processor using a first interface and that transfers second data between the second memory and a second internal memory of the processor using a second interface. The first and second memory types are different types of memories. The first and second interfaces are different from each other. The first and second internal memories are different from each other.

20 Claims, 10 Drawing Sheets

FIG. 10

MEMORY DEVICE, PROCESSING SYSTEM, AND METHOD OF CONTROLLING THE SAME

CROSS-REFERENCE TO RELATED APPLICATION

The present application claims priority under 35 U.S.C. § 119(a) to Korean patent application number 10-2018-0086544 filed in the Korean Intellectual Property Office on Jul. 25, 2018, which is incorporated herein by reference in its entirety.

BACKGROUND

The present disclosure relates to a memory device and a processing system including the memory device, and a method of controlling the processing system. In particular, some embodiments relate to a high bandwidth memory (HBM) device.

In a system including a processor and a memory device, a processor obtains data from a memory to process the data, and then store the processed results in the memory device. Therefore, a latency in receiving the data from the memory device may directly affect overall system performance.

When such a system is provided in a mobile device that relies on battery power, power consumption should be reduced to increase battery run time of the mobile device. Reduction in power consumption is also desirable even when the system is provided in a non-mobile electronic device to lower costs of operation and increase life of components of the non-mobile device.

SUMMARY

Embodiments of the present application relate to a device including a memory device, a processing system including the memory device, and a method for controlling the processing system.

In an embodiment, a device includes a first memory including a plurality of memory dice that are arranged vertically to each other, a second memory of a second type, and a controller die that transfers first data between the first memory and a first internal memory of a processor using a first interface and that transfers second data between the second memory and a second internal memory of the processor using a second interface. The first and second memory types are different types of memories. The first and second interfaces are different from each other. The first and second internal memories are different from each other. The first interface is configured for processing a first unit of data at a time and the second interface is configured for processing a second unit of data at a time, where the second unit of data is smaller than the first unit of data.

In an embodiment, a processing system includes a processor including a first internal memory and a second internal memory, a memory device, a first interface having a first bus width and coupling the processor and the memory device, and a second interface having a second bus width that is different than the first bus width and coupling the processor and the memory device. The memory device includes a first memory including a plurality of memory dice arranged vertically to each other, a second memory that is a different type of memory from the first memory, and a controller die configured to transfer data between the first memory and the processor. The processing system is configured to transfer first data between the first memory and the first internal memory of the processor using the first interface, and transfer second data between the second memory and the second internal memory of the processor using the second interface.

In an embodiment, a method for controlling a processing system that has a first memory and a processor, the first memory including a plurality of memory dice that are arranged vertically to each other, the processor including a first internal memory and a second internal memory. The method includes providing a first memory including a plurality of memory dice that are arranged vertically to each other, providing a processor including a first internal memory and a second internal memory, transferring first data between the first memory and the first internal memory of the processor using a first interface, the first interface having a first bus width, and transferring second data between a second memory and the second internal memory of the processor using a second interface. The second interface has a second bus width different than the first bus width. The second memory is a different type of memory from the first memory.

DETAILED DESCRIPTION

Embodiments of the present application relate to a device including a memory device, a processing system including a processor and the memory device, and a method for controlling the processing system. The device includes a first memory, a second memory, and a controller die that transfers first data between the first memory and a first internal memory of the processor using a first interface, and transfers second data between the second memory and a second internal memory of the processor using a second interface. In an embodiment, the first internal memory is a cache memory, and the second internal memory is a scratch pad memory. In such an embodiment, the data may be stored in the scratch pad memory using a shorter path than that used in a conventional processing system.

In an embodiment, the first interface is configured for processing a first unit of data at a time and the second interface is configured for processing a second unit of data at a time. The second unit of data is smaller than the first unit of data, so that less power may be used for transferring data to the scratch pad.

In an embodiment, the controller die selects a portion of the first data and store the selected portion to the second memory when the controller die is transferring the first data from the first memory to the first internal memory. The stored selected portion is transferred to the second internal memory for use by a processing unit, thereby increasing the storage capacity of the internal memory and increasing the data processing efficiency of the processing unit.

In an embodiment, the scratch pad memory includes a first prefetch controller for prefetching the second data from the second memory using the second interface. The second memory serves to expand the storage capacity of the scratch pad memory and increases data processing efficiency of the processing unit.

In an embodiment, the processor further includes a third internal memory (e.g., a register). The processing unit has a second prefetch controller for prefetching third data from the second memory to the register using the second interface without traveling through the scratch pad memory. The second memory serves to expand the storage capacity of the register and increases data processing efficiency of the processing unit.

A detailed description of embodiments is provided below along with accompanying figures. The scope of this disclosure is limited only by the claims and encompasses numerous alternatives, modifications and equivalents. Although steps of various processes are presented in a given order, embodiments are not necessarily limited to being performed in the listed order. In some embodiments, certain operations may be performed simultaneously, in an order other than the described order, or not performed at all.

Numerous specific details are set forth in the following description. These details are provided to promote a thorough understanding of the scope of this disclosure by way of specific examples, and embodiments may be practiced according to the claims without some of these specific details. Accordingly, the specific embodiments of this disclosure are illustrative, and are not intended to be exclusive or limiting. For the purpose of clarity, technical material that is known in the technical fields related to this disclosure has not been described in detail so that the disclosure is not unnecessarily obscured.

Figure 1:
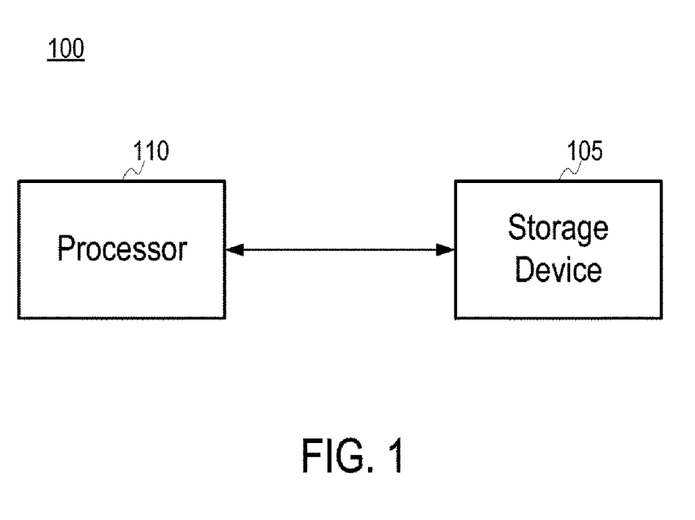
FIG. 1 illustrates a processing system according to an embodiment of the present disclosure.

FIG. 1 illustrates a processing system 100 according to an embodiment of the present disclosure. The processing system 100 includes a processor 110 and a storage device 105.

The processing system 100 may be used in various electronic systems including one or more processors. For example, the processing system 100 may be included in any one of a computer, a server, a portable computer, a tablet, a wireless phone, a mobile phone, a digital music player, a PMP (portable multimedia player), a camera, a global positioning system (GPS), a video camera, a voice recorder, a telematics, an audio visual (AV) system, or a smart television.

The processor 110 includes electronic circuits and performs various operations on the memory device 105, for example, executing instructions stored in the memory device 105. In an embodiment, the processor 110 is any one of a central processing unit (CPU), a graphic processing unit (GPU), a digital signal processor (DSP), or a combination thereof. In an embodiment, the processor 110 is provided with the memory device 105 in the form of a system on chip (SoC).

The storage device 105 stores data, e.g., data for executing the program by the processor 110 and transfers a portion of the stored data in response to a request from the processor 110. In an embodiment, the storage device 105 is a high bandwidth memory (HBM) including a plurality of stacked memory dice (or memory dice arranged vertically over each other) and a controller die. Generally, HBM devices are implemented using DRAM, a volatile memory, for its fast operation speed. In another embodiment, the storage device 105 may use storage medium other than DRAM. In yet another embodiment, the storage device 105 may include a volatile memory, a non-volatile memory, or both.

In an embodiment, the processor 110 and the storage device (e.g., a memory device) 105 are provided within a single package. By integrating the storage device 105 and the processor 110 within the same package, the processing system 100 may achieve a higher bandwidth, consume less power, and obtain a smaller form factor than a conventional processing system. For illustrative convenience, the storage device 105 will be described as a memory device hereinafter.

Figure 2:
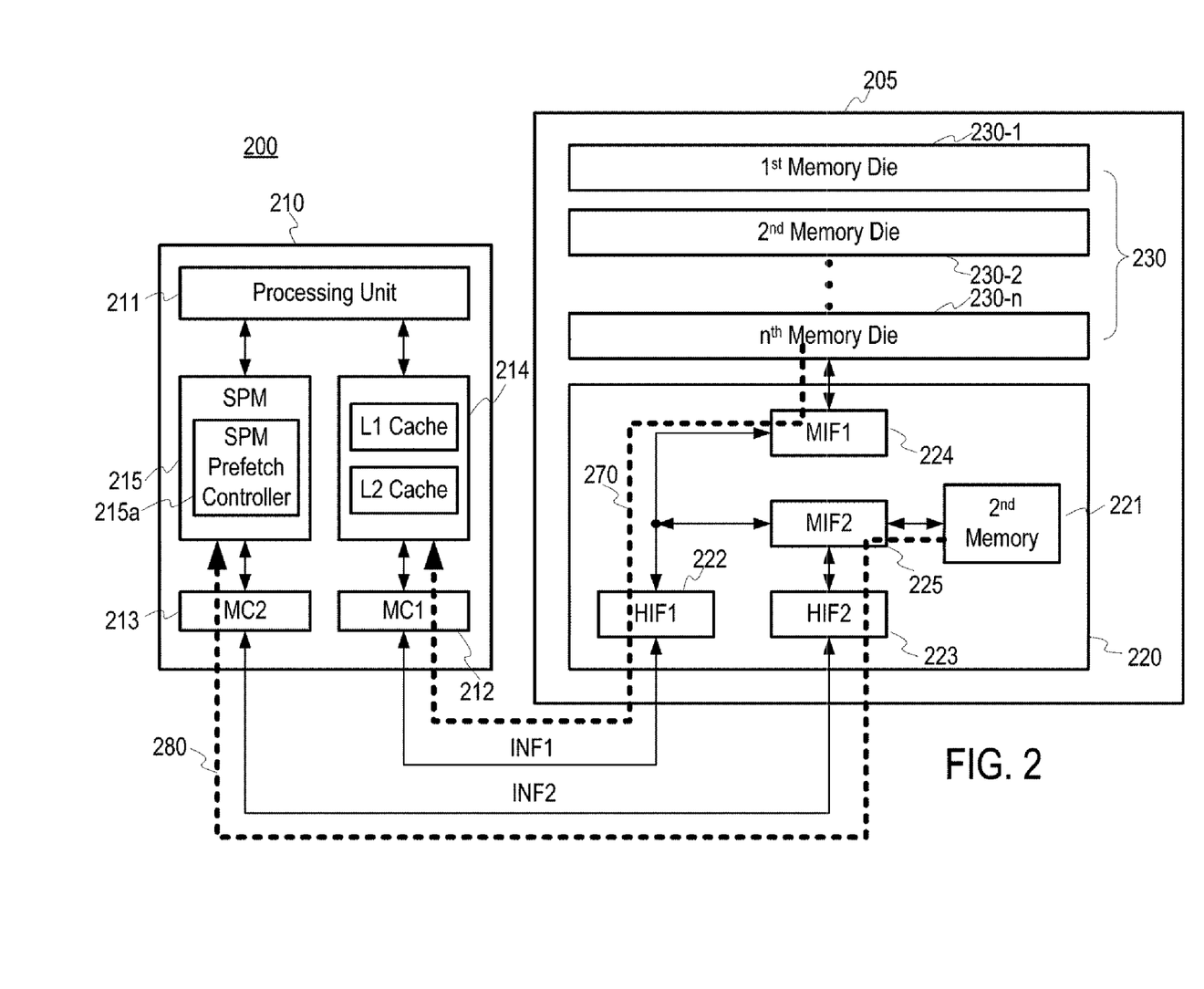
FIG. 2 illustrates a processing system according to an embodiment of the present disclosure.

FIG. 2 illustrates a processing system 200 according to an embodiment of the present disclosure. The processing system 200 includes a memory device 205 and a processor 210.

The memory device 205 includes a first memory 230 and a control unit 220. In an embodiment, the memory device 205 is a high bandwidth memory (HBM), and the first memory 130 has a three-dimensional (3D) structure in which the plurality of memory dice 130-1 to 130-$n$ are arranged vertically over the controller unit 220. The control unit 220 is provided on a controller die. Accordingly, the term "controller die" may be used to refer to the control unit 220 hereinafter. The memory dice 230-1 to 230-$n$ may each include a dynamic random access memory (DRAM), but storage medium is not limited to DRAM. For example, the storage medium may be MRAM, F-RAM, RRAM, or another types of storage medium. According to the updated second generation HBM2 specification by Joint Electron Device Engineering Council (JEDEC), the HBM (e.g., the memory device 205) may include up to twelve dice per stack. However, embodiments of the present disclosure are not limited thereto.

The controller die 220 includes a first memory interface (MIF1) 224, a first host interface (HIF1) 222, a second memory interface (MIF2) 225, a second host interface (HIF2) 223, and a second memory 221. The controller die 220 processes and transfers data between the processor 210 and the first memory 230. For example, the controller die 220 may perform a buffering operation, or a decoding operation, or both on the data being transferred between the processor 210 and the first memory 230. The controller die 220 may further perform a test operation, or a cell repair operation, or both on data stored in the first memory 230.

The first memory interface 224 transfers data between the first host interface 222 and the first memory 230. In an embodiment, the first memory interface 224 may include a decoder for selecting a memory die among the plurality of memory dice 230-1 to 230-$n$ and transferring data received from the first host interface 222 to the selected memory die.

The first host interface 222 communicates with a first memory controller 212 of the processor 210 via a first interface INF1. In an embodiment, the first host interface 222 includes a physical (PHY) area that includes one or more input/output circuits transferring signals (e.g., signals indicating addresses, data, and commands) between the first memory controller 212 and one or more components (e.g., the first memory 230) of the controller die 220.

The second memory interface 225 transfers data between the second host interface 223 and the second memory 221. In an embodiment, the second memory interface 225 may include a decoder for selecting a specific portion of the second memory 221 and transferring data received from the second host interface 223 to the selected portion of the second memory 221.

The second host interface 223 communicates with a second memory controller 213 of the processor 210 via a second interface INF2. In an embodiment, the second host interface 223 includes a physical (PHY) area that includes one or more input/output circuits transferring signals between the second memory controller 213 and one or more components (e.g., the second memory 221) of the controller die 220.

In an embodiment, the second memory 221 is a different type of memory from the first memory 230. For example, the second memory 221 has a higher operation speed and a smaller storage capacity than the first memory 230. The second memory 221 may be static random access memory (SRAM) whereas the first memory 230 may be DRAM. However, embodiments of the present disclosure are not limited thereto, and the second memory 221 may be the same type of memory as the first memory, or may be a type other than SRAM or DRAM, e.g., a next generation memory such as MRAM, F-RAM, RRAM, or the like.

The processor 210 performs various operations on one or more external data sources (e.g., the first memory 230 and the second memory 221) to control one or more data streams. The processor 210 includes a processing unit (or a processing circuit) 211, a cache 214, the first memory controller 212, the second memory controller 213, and a scratch pad memory 215.

The processing unit 211 includes a register (not shown), a processing circuit (not shown), and a control circuit (not shown). For example, the processing unit 211 includes a register file, an arithmetic logic unit (ALU), and a control unit (CU), when the processor 210 is a central processing unit (CPU). The processing unit 211, on the other hand, may include power management unit, video processing unit, display interface, graphic memory controller, compression unit, and graphics and compute array if the processor is a graphics processing unit (GPU).

The cache 214 is a high-speed memory for storing data read from the first memory 230. The cache 214 stores data that the processing unit 211 is likely to frequently access. Because the processing unit 211 can access data from the cache 214 significantly faster (e.g., 5~100 times faster) than from the first memory 230, the efficiency of the processor 210 is enhanced by using the cache 214. The cache 214 includes two levels of cache, a first level cache (L1 Cache) and a second level cache (L2 Cache). However, embodiments of the present disclosure are not limited thereto, and the cache 214 may include three or more levels of cache.

The scratch pad memory 215 is a high-speed internal memory coupled to the processing unit 211 and serves as temporary storage to hold data for rapid retrieval. For example, the scratch pad memory 215 may store data indicating operands of one or more mathematical operations when the processing unit 211 performs the mathematical operations.

The processing unit 211 may execute a software program to control data transfer to and from the scratch pad memory 215. For example, the software program identifies one or more data sections to be replaced in the scratch pad memory 215 and transfers data from the second memory 221 to the identified data sections in the scratch pad memory 215.

The scratch pad memory 215 includes a scratch pad prefetch controller 215a. The scratch pad prefetch controller 215a transfers data between the second memory 221 and the processing unit 211 through the second memory controller 213 using the second interface INF2. The scratch pad prefetch controller 215a transfers data from the second memory 221 to the scratch pad memory 215 before the processing unit 211 processes the data. The second memory 221 serves to expand the storage capacity of the scratch pad memory 215, thereby increasing data processing efficiency of the processing unit 211.

Various operations of the processing system 200 will be described in more detail below with reference to FIG. 2.

Data stored in the first memory 230 is transferred to the processor 210 along a first path 270 using the first interface INF1. The first path 270 includes the first memory interface 224, the first host interface 222, and the first memory controller 212. In an embodiment, the first interface INF1 is configured for handling a relatively large amount of data and uses a protocol suitable for processing a relatively large unit of data at a time (e.g., 256 bits or more) to efficiently handle data having a relatively large size. For example, the first interface INF1 may be a 128-bit data bus operating at double data rate or greater.

When the data stored in the first memory 230 is transferred to the processor 210 along the first path 270, one or more portions of the data may be stored in the second memory 221. For example, the second memory interface 225 receives the data being transferred and provides one or more portions of the data to the second memory 221 for storage therein. In an embodiment, the second memory interface 225 includes a data transfer controller (e.g., a data transfer controller 525a in FIG. 5) and a path selector (e.g., a path selector 525b in FIG. 5).

Data to be stored in the scratch pad memory 215 is transferred from the second memory 221 to the scratch pad memory 215 through a second path 280 using the second interface INF2. The second path 280 includes the second memory interface 225, the second host interface 223, and the second memory controller 213. In an embodiment, the second interface INF2 is configured for handling data having a relatively small size at a high operation speed and uses a protocol suitable for processing a smaller unit of data at a time (e.g., 64 bits or less) than that of the first interface INF1. For example, the second interface INF2 may be a 32-bit data bus operating at double data rate. Smaller channel interface of the second interface INF2 enables it to more efficiently handle data having a smaller size with a shorter latency compared to the first interface INF1 while consuming less power.

In an embodiment, the processing system 200 provides a shorter path (e.g., the second path 280) for storing data in the scratch pad memory 215 than that used in a conventional processing system. In the conventional processing system, data to be stored in the scratch pad memory 215 may be transferred from the first memory 230 through a third path (not shown) that includes the first memory interface 214, the first host interface 222, the first memory controller 212, the cache 214, the processing unit 211, and the scratch pad memory 215.

In other words, in the conventional processing system, the data transmitted from the first memory 230 flow through the processing unit 211 prior to being stored in the scratch pad memory 215, thereby resulting in a longer path than the second path 280 in FIG. 2. For the second path 280, however, data are transmitted from the second memory 221 in the controller die 220 (rather than from the first memory 230) and does not pass through the processing unit 211. The second path 280 defines a shorter path and reduces latency in receiving and storing data in the scratch pad memory 215.

In addition, the conventional processing system may use the first interface INF1 to transfer data from the first memory 230 to the scratch pad memory 215. The first interface INF1 is configured for transmitting data between the first memory 230 and the processing unit 211 and uses a protocol suitable for a relatively large unit of data, e.g., 128-bit data bus operating at double data rate. Because data to be stored in the scratch pad memory 115 are relatively small in size, the data payload transmitted over the first interface INF1 may include unnecessary portions that have been read from the first memory 230, which would waste power in reading and transferring unnecessary information and result in inefficient use of the system resources.

Accordingly, the processing system 200 of FIG. 2 uses the second interface INF2 to transfer data from the second memory 221 to the scratch pad memory 215. The second interface INF2 is configured for handling smaller data and has a smaller bus width (e.g., 32-bit or 64-bit) than that of the first interface INF1. Data having a relatively small size are transmitted more efficiently with a relatively short latency over the second interface INF2. As a result, the processing system 200 according to an embodiment may consume less power for transferring the data to the scratch pad 215 compared to a conventional processing system.

As described above, a processing system (e.g., the processing system 200 in FIG. 2) according to an embodiment of the present disclosure may reduce latency and power consumption when transferring data to an internal memory (e.g., the scratch pad memory 215 in FIG. 2) of a processor from a memory device 205, compared to a conventional processing system. In addition, the processing system according to such embodiment expands the storage capacity of the internal memory of the processor by providing a memory (e.g., the second memory 221) in the memory device 205, more specifically in the controller die 220, thereby increasing processor efficiency.

Figure 3:
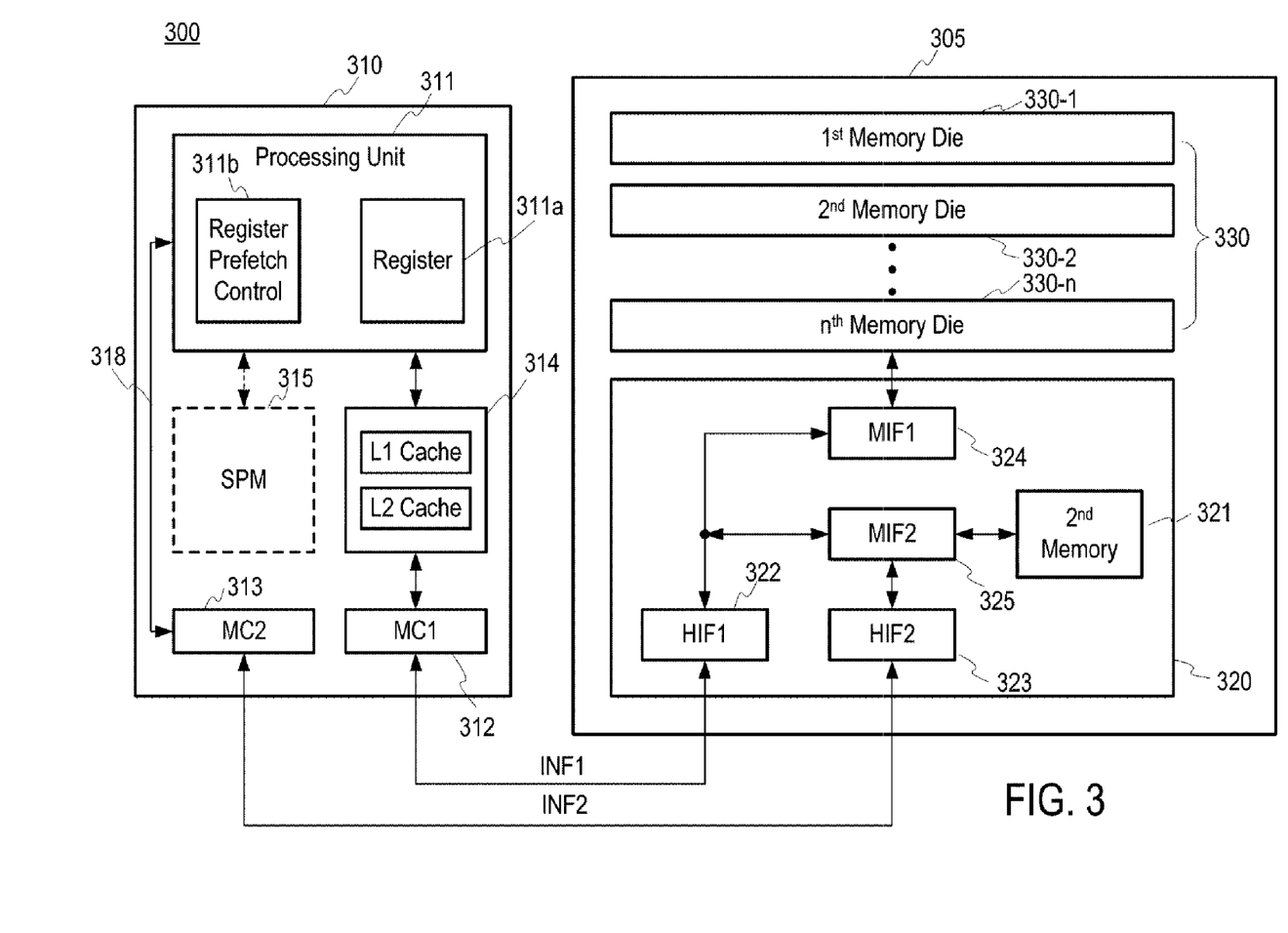
FIG. 3 illustrates a processing system according to an embodiment of the present disclosure.

FIG. 3 illustrates a processing system 300 having a processor 310 and a memory device 305 according to an embodiment of the present disclosure. The processor 310 includes a processing unit 311 having a register prefetch controller 311b. The processing unit 311 is connected to the second memory controller 313 via a connection 318 and may communicate directly with the controller 313, rather than via a scratch pad memory as in the processor 210 of FIG. 2. The processing unit 311 may control the second memory 321 using the second memory controller 313. In an embodiment, the scratch memory 315 is not connected to the second memory controller 313 unlike the scratch memory 215 of FIG. 2.

The register prefetch controller 311b of the processing unit 311 controls data transfer with the second memory 321 using the second memory controller 313 and the second interface INT2. For example, the register prefetch controller 311b may transfer data from the second memory 321, and store the transferred data in the register 311a in anticipation of later use by the processing unit 311. In an embodiment, when a program has been compiled by the processor 310 and information to be stored in the register 311a is known, the register prefetch controller 311b fetches data corresponding to the information from the second memory 321 to store the data in the register 311a before the processing unit 311 processes the stored data. The second memory 321 serves to expand the storage capacity of the register 311a, thereby increasing data processing efficiency of the processing unit 311. In addition, because the data is directly transferred between the processing unit 311 and the second memory controller 313 without passing through either the scratch pad memory 315 or the cache 314, the processing unit 311 may exchange the data with the second memory 321 at a higher speed than the processing unit 211 of FIG. 2.

The processor 310 may or may not include the scratch pad memory 315 according to implementation. For example, if the register 311a and the second memory 321 provide sufficiently large storage capacity to perform data processing operations in the processor 310, the scratch pad memory 315 in FIG. 3 may be omitted.

Other operations of the processing system 300 are similar to those of the processing system 200 of FIG. 2. Accordingly, detailed descriptions of these operations of the processing system 300 are omitted herein.

Figure 4:
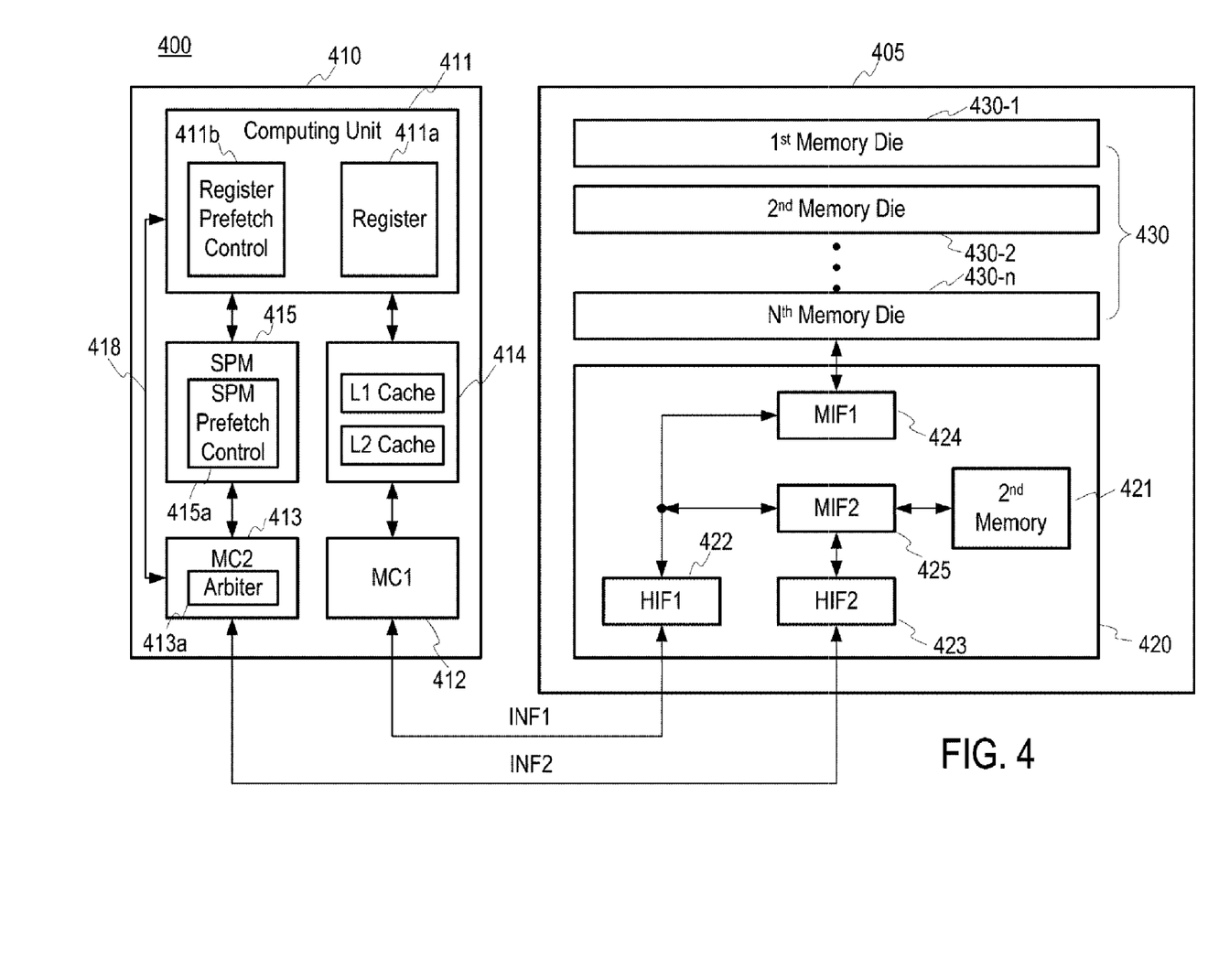
FIG. 4 illustrates a processing system according to an embodiment of the present disclosure.

FIG. 4 illustrates a processing system 400 including a memory device 405 and a processor 410 according to an embodiment of the present disclosure. The processor 410 includes a processing unit 411 having a register prefetch controller 411b and connected to the second memory controller 413 via a connection 418. Thus, the processing unit 411 may directly communicate with the second memory controller 413 and access the second memory 421 at a higher speed than the processing unit 211 of FIG. 2. The second memory 421 may serve to expand the storage capacity of the register 411a.

A scratch pad memory 415 includes a scratch pad prefetch controller 415a and may access the second memory 421 via the second memory controller 413 similarly to the scratch pad memory of FIG. 2. The second memory 421 may serve to expand the storage capacity of the scratch pad memory 415.

The second memory controller 413 may receive access requests for the second memory 421 from the processing unit 411 and the scratch pad memory 415. An arbiter 413a of the second memory controller 413 is used to grant access requests from the processing unit 411 and the second memory 421. In an embodiment, the arbiter 413a grants the access requests according to a specific priority, e.g., priority is given to the processing unit 411 or to the scratch pad memory 415 according to implementation. In another embodiment, the arbiter 413 grants the access requests according to the order received.

Figure 5:
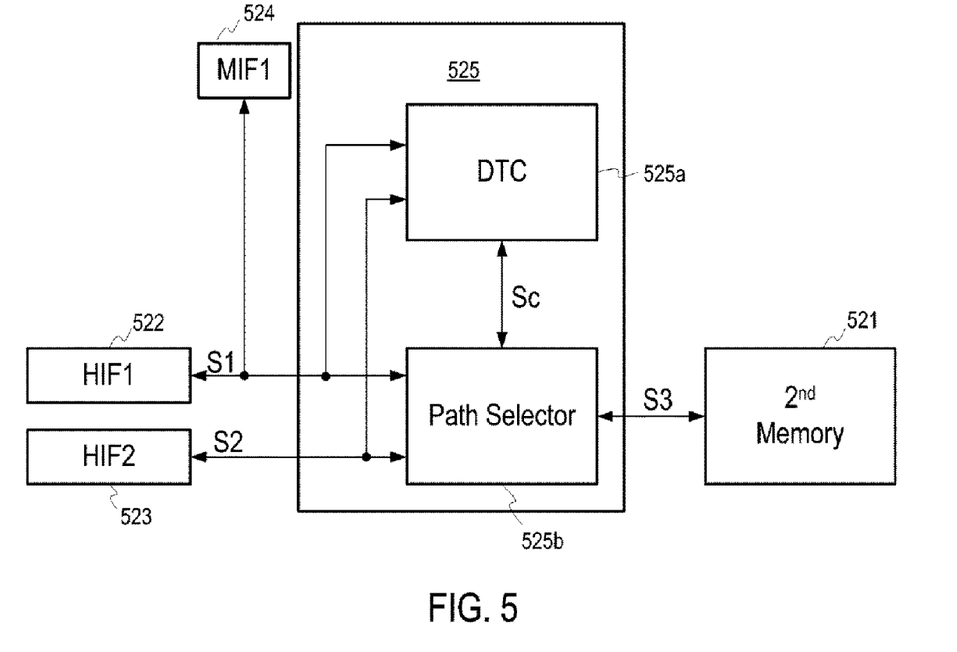
FIG. 5 illustrates a second memory interface according to an embodiment of the present disclosure.

FIG. 5 illustrates a second memory interface 525 according to an embodiment of the present disclosure. The second memory interface 525 corresponds to the second memory interface 225 of FIG. 2 and includes a data transfer controller (DTC) 525a and a path selector 525b.

The path selector 525b selects one of a first signal S1 and a second signal S2, and outputs the selected signal as a third signal S3 to a second memory 521. The first signal S1 is transmitted between a first host interface 522 and a first memory interface 524, and the second signal S2 is transmitted between a second host interface 523 and the path selector 525b. In addition, the path selector 525b outputs the third signal S3 received from the second memory 521 to either the first host interface 522 as the first signal S1 or the second host interface 523 as the second signal S2. In an embodiment, the path selector 525b is an integrated device combining a multiplexer and a demultiplexer together. In another embodiment, the path selector 525b includes a multiplexer and a demultiplexer as separate components.

In an embodiment, the first signal S1 denotes data transmitted between a processor (e.g., the processor 210 in FIG. 2) and a first memory (e.g., the first memory 130 in FIG. 2), and the second signal S2 denotes data transferred between the processor and the second memory 121. The path selector 525b may perform a signal selection operation in response to a control signal Sc output from the data transfer controller 525a.

The data transfer controller 525a receives the first signal S1 and the second signal S2 and generates the control signal Sc in response to the first and second signals S1 and S2. In an embodiment, the data transfer controller 525a controls the path selector 525b to select the first signal S1 when the controller 525a determines one or more portions of data being transferred to the processor should be transferred to an internal memory (e.g., the scratch pad memory 215 in FIG. 2) of the processor. For example, when the data transfer controller 525a determines a portion of the data being transferred from the first memory to the processor is likely to be used by a processing unit (e.g., the processing unit 211 in FIG. 2) in a future operation. The data transfer controller 525a may assert the control signal Sc to control the path selector 525b to select the first signal S1 and initiate transfer of the data portion to the second memory 521. The data portion is stored in the second memory 521, and then transferred to an internal memory (e.g., a register 411a or a scratch pad memory 415 in FIG. 4) of the processor for its use.

In addition, the data transfer controller 525a may control the path selector 525b to transfer the data stored in the second memory 521 to the first memory, or a cache (e.g., the cache 214 in FIG. 2), or both. The data transfer controller 525a may also control the path selector 525b to transfer the data stored in the second memory 521 to the internal memory of the processor.

Figure 6:
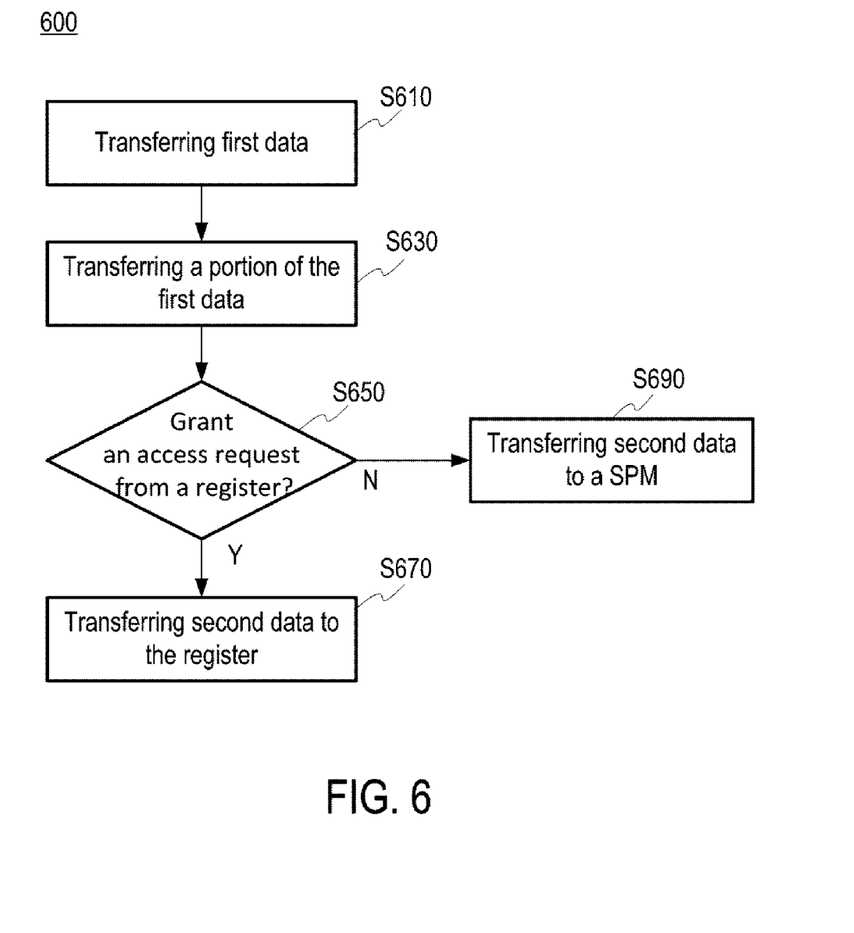
FIG. 6 illustrates a process performed by a processing system according to an embodiment of the present disclosure.

FIG. 6 illustrates a process 600 performed by a processing system according to an embodiment. Although the process 600 may be used with various processing systems, it is described in connection with the processing system in FIG. 4 and the second memory interface 525 in FIG. 5 and for illustrative convenience.

At S610, the controller die transfers first data from the first memory using a first interface (e.g., the first interface INF1 in FIG. 4). In an embodiment, the first memory is a high bandwidth memory (HBM) including a plurality of memory dice, each of which includes dynamic random access memory (DRAM).

At S630, the controller die selects one or more portions of the first data from the first memory when the first data is being transferred and stores these portions of the first data in the second memory. In an embodiment, the controller die includes a data transfer controller (e.g., the data transfer controller 525a in FIG. 5) and a path selector (e.g., the path selector 525b in FIG. 5). The data transfer controller receives a first signal (e.g., the first signal S1 in FIG. 5) from the first memory and a second signal (e.g., the second signal S2 in FIG. 5) from the processor and generates a control signal (e.g., the control signal Sc in FIG. 5) in response to the first signal and the second signal. The path selector selects the first signal or the second signal in response to the control signal and provides the selected signal to the second memory.

At S650, when the arbiter in the processor receives a first access request from the scratch pad memory and a second access request from the processing unit, the arbiter prioritizes the requests according to a rule. In an embodiment, the arbiter gives priority to the second access request from the processing unit. In another embodiment, the arbiter gives priority to the first access request from the scratch pad memory. In yet another embodiment, the arbiter prioritizes the first and second access requests according to the order received.

When the arbiter grants the second request from the processing unit, the process 600 proceeds to S670. At S670, the controller die transfers second data stored in the second memory to the register of the processing unit using a second interface (e.g., the second interface INT2 in FIG. 4). In an embodiment, the controller die transfers the second data from the second memory to the register bypassing (or without traveling through) the scratch pad memory.

When the arbiter grants the first request from the scratch pad memory, the process 600 proceeds to S690. At S690, the controller die transfers the second data stored in the second memory to the scratch pad memory using the second interface. The second memory may be used to provide additional storage capacity for the scratch pad memory and/or the register, thereby increasing data processing efficiency of the processor.

Figure 7:
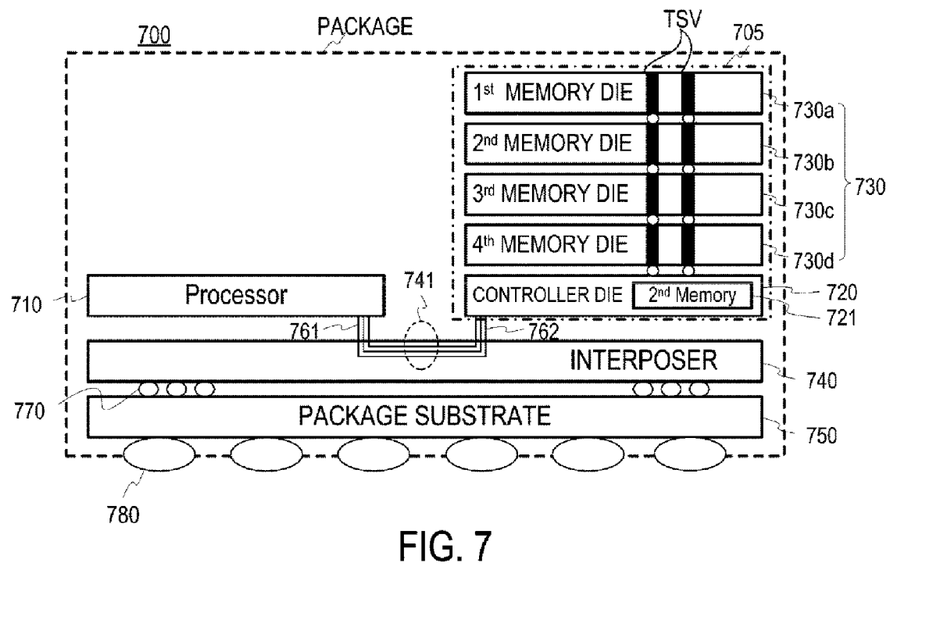
FIG. 7 is a cross-sectional view of a processing system according to an embodiment of the present disclosure.

FIG. 7 illustrates a processing system 700 according to an embodiment of the present disclosure. The processing system 700 is a package device including a processor 710 and a memory device 705.

The processor 710 and the memory device 705 are mounted on an interposer 740 in the same package. Data are transferred between the processor 710 and the memory device 705 using a first interface (e.g., the first interface INF1 in FIG. 2), or a second interface (e.g., the second interface INF2 in FIG. 2), or both.

The interposer 740 is provided on a package substrate 750. The interposer 740 electrically couples the processor 710 and the memory device 705. The processor 710 is disposed over a first upper surface area of the interposer 740 and electrically coupled to the interposer 740 through a first connection portion 761. A plurality of lines 741 are connected to the first connection portion 761 and provide electrical coupling to the memory device 705 through a second connection portion 762.

The memory device 705 is disposed over a second upper surface area adjacent to the first upper surface area of the interposer 740. The memory device 705 includes a controller die (e.g., a base die) 720 and a first memory 730 having a plurality of memory dice 730a to 730d. The controller 720 includes a second memory 721.

The controller die 720 processes and transfers data between the processor 710 and the first memory 730. The controller die 720 is coupled to the lines 741 of the interposer 740 through the second connection portion 762 and includes one or more interfaces (e.g., the first memory interface 224 and the second memory interface 225 in FIG. 2) for communication with the processor 710. In an embodiment, the second connection portion 762 includes one or more micro bumps, but embodiments are not limited thereto. For example, the controller die 720 may be coupled to the first memory 730 using one or more through-silicon vias (TSVs).

The first memory 730 includes the plurality of memory dice 730a to 730d that are stacked vertically over the controller die 720 providing a three-dimensional memory structure. In an embodiment, the first memory 730 is as a high bandwidth memory (HBM). The first memory 730 includes four memory dice 730a to 730d, but embodiments of the present disclosure are not limited thereto. In an embodiment, each of the plurality of memory dice 130a to 130d includes a dynamic random access memory (DRAM).

The second memory 721 is defined on the controller die 720, but embodiments of the present disclosure are not limited thereto. In other embodiments, the second memory 721 is disposed in a memory die (e.g., a memory die 880 in FIG. 8) apart from the base die 720.

The package substrate 750 is disposed below the interposer 740 and is electrically coupled to the interposer 740 through a third connection portion 770. An external connection terminal 780 for electrical communication with a device external to the package is disposed under the package substrate 750.

In an embodiment, the processing system (or package device) 700 is implemented in a single package. When the first memory 730 including the plurality of stacked memory dice 730a to 730d is disposed in the single package with the processor 710, the processing system 700 may achieve a higher bandwidth, consume less power, and obtain a smaller form factor than a conventional processing system.

Figure 8:
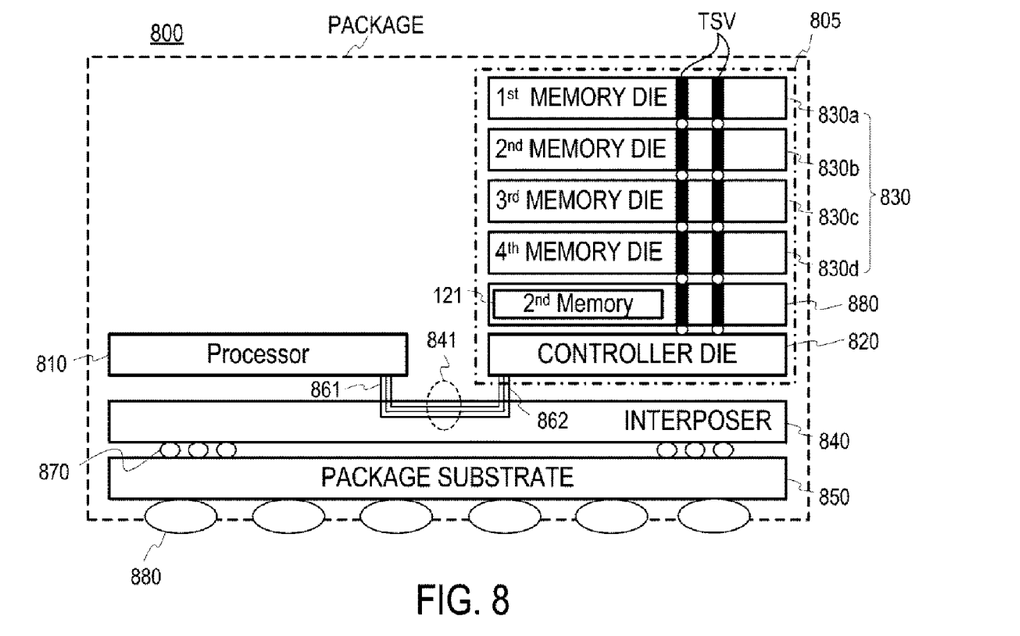
FIG. 8 is a cross-sectional view of a processing system according to an embodiment of the present disclosure.

FIG. 8 illustrates a processing system 800 according to an embodiment of the present disclosure. The processing system 800 includes a processor 810 and a memory device 805.

The memory device 805 includes first memory 830 and a controller die (e.g., a base die) 820. In the memory device 805, a second memory 821 in a different die than the controller die 820, e.g., on a die 880 provided between the first memory 830 and the controller die 820.

In an embodiment, the die 880 is a memory die, and the second memory 821 may be allocated with greater storage capacity than when it is disposed in the base die 720 in FIG. 7. The die 880 is disposed between the controller die 820 and a bottommost memory die 830d of the first memory 830, but embodiments of the present disclosure are not limited thereto. In an embodiment, the die 880 may also provide storage for the first memory 830 and functions partly as the first memory 830.

Figure 9:
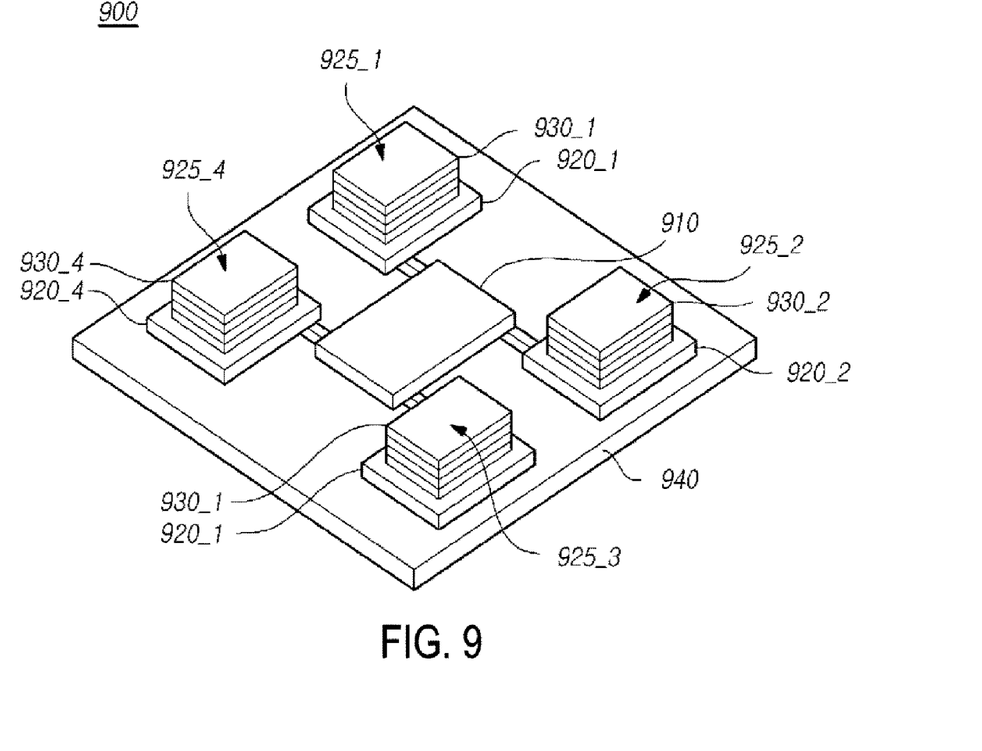
FIG. 9 is a perspective view of a processing system according to an embodiment of the present disclosure.

FIG. 9 illustrates a processing system 900 according to an embodiment of the present disclosure. The processing system 900 includes a processor 910, a plurality of memory devices 925_1 to 925_4, and an interposer 940. The plurality of memory devices 925_1 to 925_4 are coupled to the processor 910, and the plurality of memory devices 925_1 to 925_4 and the processor 910 are disposed over the interposer 940.

Each of the memory devices 925_1 to 925_4 has substantially the same configuration as the memory device 730 in FIG. 7. For example, each of first memories 930_1 to 930_4 corresponds to the first memory 730 of FIG. 7, each of controller dice 920_1 to 920_4 corresponds to the controller die 720 of FIG. 7. Although the memory devices 925_1 to 925_4 in FIG. 9 each have substantially the same configuration as the memory device 730 in FIG. 7, embodiments of the present disclosure are not limited thereto. For example, one or more of the memory devices 925_1 to 925_4 in FIG. 9 may have a different configuration (e.g., the configuration of the memory device 830 in FIG. 8) from the remaining ones of the memory devices 925_1 to 925_4.

Figure 10:
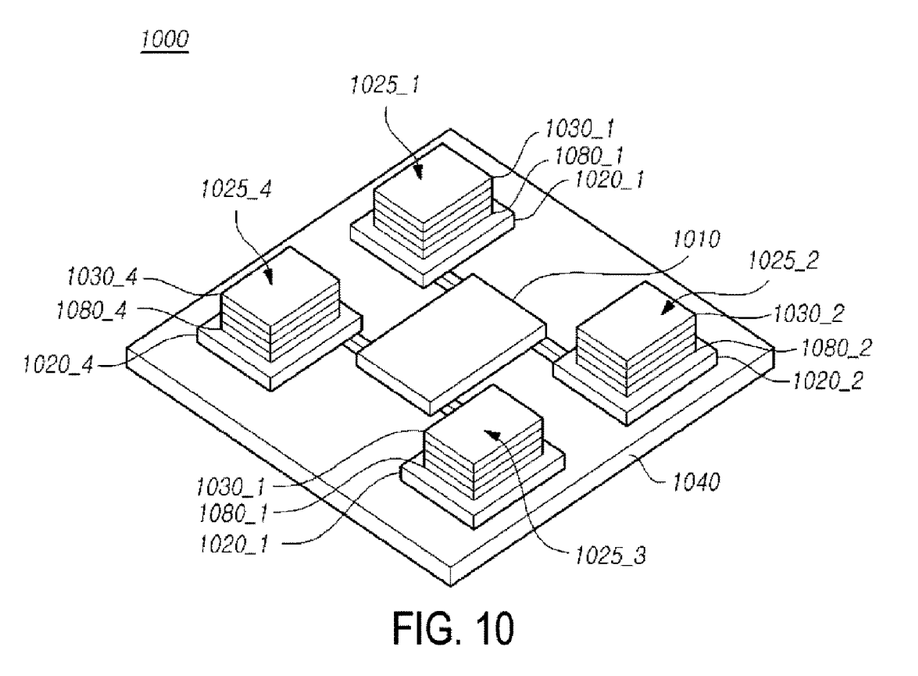
FIG. 10 is a perspective view of a processing system according to an embodiment of the present disclosure.

FIG. 10 illustrates a processing system 1000 with a second memory provided apart from a controller die according to an embodiment of the present disclosure. For example, a second memory (not shown) is disposed on a die (e.g., a die 1080_1) that is disposed over a controller die (e.g., a controller die 920_1). The processing system 1000 includes a processor 1010, a plurality of memory devices 1025_1 to 1025_4, and an interposer 1040. The plurality of memory devices 1025_1 to 1025_4 are coupled to the processor 1010, and the plurality of memory devices 1025_1 to 1025_4 and the processor 1010 are disposed over the interposer 1040. Memory dice 1080_1 to 1080_4 are provided between the first memories 1030_1 to 1030_4 and the controller dice 1020_1 to 1020_4, respectively.

Aspects of the present disclosure have been described in conjunction with the specific embodiments thereof that are proposed as examples. Numerous alternatives, modifications, and variations to the embodiments as set forth herein may be made without departing from the scope of the claims set forth below. Accordingly, embodiments as set forth herein are intended to be illustrative and not limiting.

What is claimed is:

1. A device, comprising:
a first memory including a plurality of memory dice, the memory dice being arranged vertically to each other, the first memory being a first type;
a second memory of a second type, the first and second memory types being different types of memories; and
a controller die configured to transfer first data between the first memory and a first internal memory of a processor using a first interface, and to transfer second data between the second memory and a second internal memory of the processor using a second interface, the first and second interfaces being different from each other, the first and second internal memories being different from each other,
wherein the second memory is disposed within the controller die,
wherein the second internal memory is a scratch pad memory configured to store data indicating operands of one or more mathematical operations performed by the processor.

2. The device of claim 1, wherein the first internal memory is a cache memory.

3. The device of claim 2, wherein the controller die is configured to transfer third data between the second memory and a third internal memory of the processor using the second interface.

4. The device of claim 1, wherein the first interface is configured for processing a first unit of data at a time, and the second interface is configured for processing a second unit of data at a time, the second unit of data being smaller than the first unit of data.

5. The device of claim 4, wherein the device is a memory device, and
wherein the first interface has a first bus width and the second interface has a second bus width that is smaller than the first bus width.

6. The device of claim 1, wherein the controller die is configured to select a portion from the first data being transferred from the first memory to the first internal memory and store the selected portion in the second.

7. The device of claim 1, further comprising:
an interposer having first and second upper surface areas,
wherein the controller die includes the second memory that is provided over a first upper surface area of the interposer, the processor is provided over a second upper surface area of the interposer, and the plurality of memory dice of the first memory are disposed over the controller die.

8. The device of claim 1, further comprising a memory die disposed between the plurality of memory dice of the first memory and the controller die.

9. A processing system, comprising:
a processor including a first internal memory and a second internal memory;
a memory device including a first memory including a plurality of memory dice arranged vertically to each other, a second memory that is a different type of memory from the first memory, and a controller die configured to transfer data between the first memory and the processor;

a first interface having a first bus width and coupling the processor and the memory device; and a second interface having a second bus width that is different than the first bus width and coupling the processor and the memory device, wherein the processing system is configured to transfer first data between the first memory and the first internal memory of the processor using the first interface, and transfer second data between the second memory and the second internal memory of the processor using the second interface, wherein the second memory is disposed within the controller die, wherein the second internal memory of the processor is a scratch pad memory configured to store data indicating operands of one or more mathematical operations performed by the processor.

10. The processing system of claim 9, wherein the first internal memory is a cache memory.

11. The processing system of claim 10, wherein the scratch pad memory includes a first prefetch controller for prefetching the second data from the second memory using the second interface, the second interface having a smaller bus width than the first interface.

12. The processing system of claim 11, wherein the processor further includes a processing unit and a third internal memory, the processing unit having a second prefetch controller for prefetching third data from the second memory to the third internal memory using the second interface and bypassing the scratch pad memory.

13. The processing system of claim 12, wherein the processor further includes an arbiter configured to arbitrate between a first access request from the processing unit and a second access request from the scratch pad memory.

14. The processing system of claim 9, wherein the first interface is configured for processing a first unit of data at a time and the second interface is configured for processing a second unit of data at a time, the second unit of data being smaller than the first unit of data.

15. The processing system of claim 9, wherein the controller die includes a memory controller coupled to the first memory and the second memory, the memory controller selecting one or more portions of the first data from the first data being transferred from the first memory to the first internal memory and transferring the selected portions of the first data to the second memory.

16. The processing system of claim 15, wherein the memory controller includes:

a data transfer controller receiving a first signal from the first memory and a second signal from the second memory and generating a control signal in response to the first signal and the second signal; and a path selector selecting one of the first signal and the second signal in response to the control signal and providing the selected signal to the second memory.

17. The processing system of claim 9, wherein the processor and the memory device are disposed in a single package.

18. A method for controlling a processing system having a first memory and a processor, the first memory including a plurality of memory dice that are arranged vertically to each other, the processor including a first internal memory and a second internal memory, the method comprising:

transferring, by a controller die, first data between the first memory and the first internal memory of the processor using a first interface, the first interface having a first bus width; and transferring, by the controller die, second data between a second memory and the second internal memory of the processor using a second interface, the second interface having a second bus width different than the first bus width, the second memory being a different type of memory from the first memory, wherein the second memory is disposed within the controller die, wherein the second internal memory of the processor is a scratch pad memory configured to store data indicating operands of one or more mathematical operations performed by the processor.

19. The method of claim 18, wherein the first internal memory is a cache memory.

20. The method of claim 19, further comprising prefetching third data from the second memory to a third internal memory of the processor using the second interface and bypassing the scratch pad memory.

* * * * *